(12) United States Patent
Yoon

(10) Patent No.: US 8,395,895 B2
(45) Date of Patent: Mar. 12, 2013

(54) IMAGE READING DEVICE

(75) Inventor: Kwon Ho Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 299 days.

(21) Appl. No.: 12/654,299

(22) Filed: Dec. 16, 2009

(65) Prior Publication Data

US 2010/0157529 A1    Jun. 24, 2010

(30) Foreign Application Priority Data

Dec. 18, 2008   (KR) .......................... 10-2008-0129380

(51) Int. Cl.
*H05K 7/20*   (2006.01)
(52) U.S. Cl. ........................................ 361/695; 361/690
(58) Field of Classification Search .................. 361/690, 361/695
See application file for complete search history.

(56) References Cited

U.S. PATENT DOCUMENTS

| 5,126,789 | A  | * | 6/1992  | Fukuchi et al. ............... 399/18 |
| 5,191,361 | A  | * | 3/1993  | Abe .............................. 347/116 |
| 5,208,730 | A  | * | 5/1993  | Tracy ........................ 361/679.48 |
| 6,633,489 | B2 | * | 10/2003 | Callahan et al. .............. 361/771 |
| 6,912,127 | B2 | * | 6/2005  | Hutchinson et al. .......... 361/695 |
| 2008/0038008 | A1 | * | 2/2008 | Fujita et al. .................... 399/92 |
| 2011/0142481 | A1 | * | 6/2011 | Kwak ............................. 399/92 |
| 2011/0200494 | A1 | * | 8/2011 | Tanaka ......................... 422/211 |

FOREIGN PATENT DOCUMENTS

| JP | 07-213842 |   | 8/1995 |
| JP | 2006346932 A | * | 12/2006 |

* cited by examiner

*Primary Examiner* — Anatoly Vortman
(74) *Attorney, Agent, or Firm* — Staas & Halsey LLP

(57) ABSTRACT

An image reading device, and more particularly an image reading device having a cooler capable of preventing introduction of impurities and reducing vibration and noise. The image reading device includes a body having a reading unit, and a cooler disposed in the body cooling the reading unit. The cooler includes a housing, a cooling unit disposed in the body and moving air into the body, a filter member disposed apart from the cooling unit and removing dust contained in the air, and a damper member having one side supported by the filter member and the other side supported by the cooling unit.

17 Claims, 6 Drawing Sheets

IMAGE READING DEVICE

CROSS-REFERENCE TO RELATED APPLICATION

This application claims the benefit of Korean Application No. 10-2008-0129380, filed Dec. 18, 2008, in the Korean Intellectual Property Office, the disclosure of which is incorporated herein by reference.

BACKGROUND OF THE INVENTION

1. Field of the Invention

Aspects of the present invention relate to an image reading device, and, more particularly, to an image reading device having an improved cooler to remove heat generated from the interior of the device.

2. Description of the Related Art

There are a variety of electronic appliances including, for example, image forming apparatuses, such as digital copiers, facsimiles, and devices combining functions thereof, and image reading devices provided in the image forming apparatuses, or other similar apparatuses.

Since electronic appliances contain electronic elements therein, generation of heat is inevitable after continuous operation for a predetermined time. For this reason, electronic appliances include a cooler to remove heat generated therein.

The cooler includes a motor and a fan, and is generally adapted to forcibly move outside air into an electronic appliance for removal of heat generated in the electronic appliance. Such forced movement of outside air, however, causes impurities, such as dust, etc., contained in the outside air to be introduced into the electronic appliance. This is particularly problematic in the case of an image reading device having optical elements therein because introduction of the impurities due to the cooler causes contamination of the optical elements.

SUMMARY OF THE INVENTION

Aspects of the present invention provide an image reading device with a cooler capable of preventing introduction of impurities.

Another aspect of the present invention provides an image reading device with a cooler capable of reducing vibration and noise.

According to aspects of the present invention, there is provided an image reading device including: a body having a reading unit; and a cooler, disposed in the body and cooling the reading unit, comprising: a housing; a cooling unit disposed in the body and moving air into the body; a filter member disposed apart from the cooling unit and removing dust contained in the air; and a damper member having one side supported by the filter member and the other side supported by the cooling unit.

According to another aspect of the present invention, the damper member and filter member may be integrally formed as one unit.

According to another aspect of the present invention, the damper member and filter member may be formed of an elastic material.

According to another aspect of the present invention, the damper member and filter member may be formed of sponge.

According to another aspect of the present invention, the cooling unit may be coupled to the top of the housing and the filter member may be coupled to the bottom of the housing.

According to another aspect of the present invention, the filter member may include a seating recess, and the housing may include a seating protrusion to be inserted into the seating recess.

According to another aspect of the present invention, the housing may include an opening, and the filter member may cover the opening.

Aspects of the invention provide an image reading device including: a body having a reading unit; a housing disposed in the body; a cooling unit disposed in the housing and cooling the reading unit; a filter member disposed in the housing and filtering dust contained in air; and a damper member disposed between the filter member and the cooling unit in a predetermined space therebetween.

According to another aspect of the present invention, the damper member and filter member may be integrally formed with each other.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
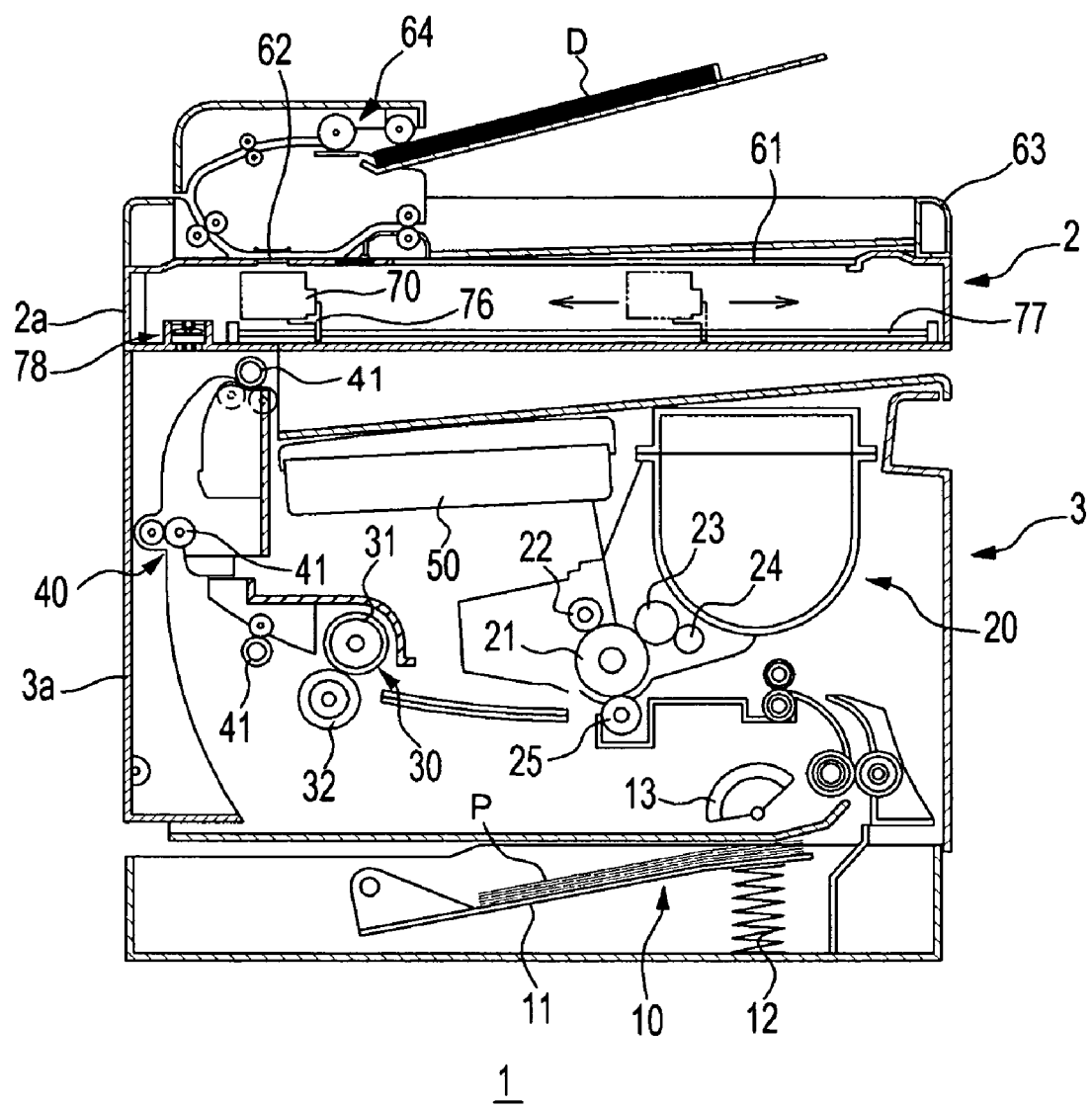
FIG. 1 illustrates a combined device having an image reading device according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

When a first element is described as being coupled to a second element, the first element may be not be only directly coupled to the second element but may also be indirectly coupled to the second element via a third element. Moreover, it is to be understood that where is stated herein that element is "disposed on" or "disposed in" a second element, the first element may be disposed directly on the second element or there may be intervening elements between the first element and the second element.

FIG. 1 is a view illustrating a combined device having an image reading device according to an embodiment of the present invention.

As shown in FIG. 1, the combined device 1, according to the present embodiment, includes an image reading device 2 reading an image from a document and a printing device 3 to print the image on a recording medium. The combined device 1, image reading device 2 and printing device 3 are all electronic appliances.

The printing device 3 prints an image according to information received from the image reading device 2, or signals input from an external appliance, such as a PC, or other similar external appliances. The printing device 3 includes a printing device body 3a containing constituent elements of the printing device 3, a paper supply unit 10 to supply printing media such as paper P, or other printing media such as, transparencies, envelopes, printing labels, etc., a developing unit 20 to develop an image on the paper, a fusing unit 30 to fix the image to the paper by applying heat and pressure to the paper, and a paper discharge unit 40 to discharge the paper, on which the image is printed, to the outside.

The paper supply unit 10 includes a paper tray 11 on which the paper P is loaded, and a spring 12 to elastically support the paper tray 11. The paper P loaded on the paper tray 11 is picked up sheet by sheet by a paper pickup roller 13, and is delivered to the developing unit 20.

The developing unit 20 includes a photosensitive drum 21 on a surface of which an electrostatic latent image is formed by an exposure unit 50, a charging roller 22 to charge the photosensitive drum 21, a developing roller 23 to feed toner to the electrostatic latent image formed on the photosensitive drum 21, a feeding roller 24 to feed the toner to the developing roller 23, and a transfer roller 25 to press the paper toward the photosensitive drum 21 in order to transfer a toner image formed on the photosensitive drum 21 to the paper.

The fusing unit 30 includes a heating roller 31 having a heater and a press roller 32 arranged opposite the heating roller 31 and adapted to keep a predetermined fusing pressure between it and the heating roller 31.

The paper discharge unit 40 includes a series of paper discharge rollers 41 successively arranged to discharge the paper, having passed through the fusing unit 30, to the outside.

The image reading device 2 includes a reading device body 2a containing constituent elements of the image reading device 2, a flat panel glass 61 and an automatic document feeder (ADF) glass 62 provided at an upper surface of the reading device body 2a, the flat panel glass 61 being installed to allow a user to directly scan each document placed thereon, a cover 63 coupled by a hinge to the reading device body 2a and used to open or close the flat panel glass 61, an automatic document feeder (ADF) 64 to automatically feed documents to enable successive scanning of the documents, and a reading unit 70 to read image information recorded on a document.

Figure 2:
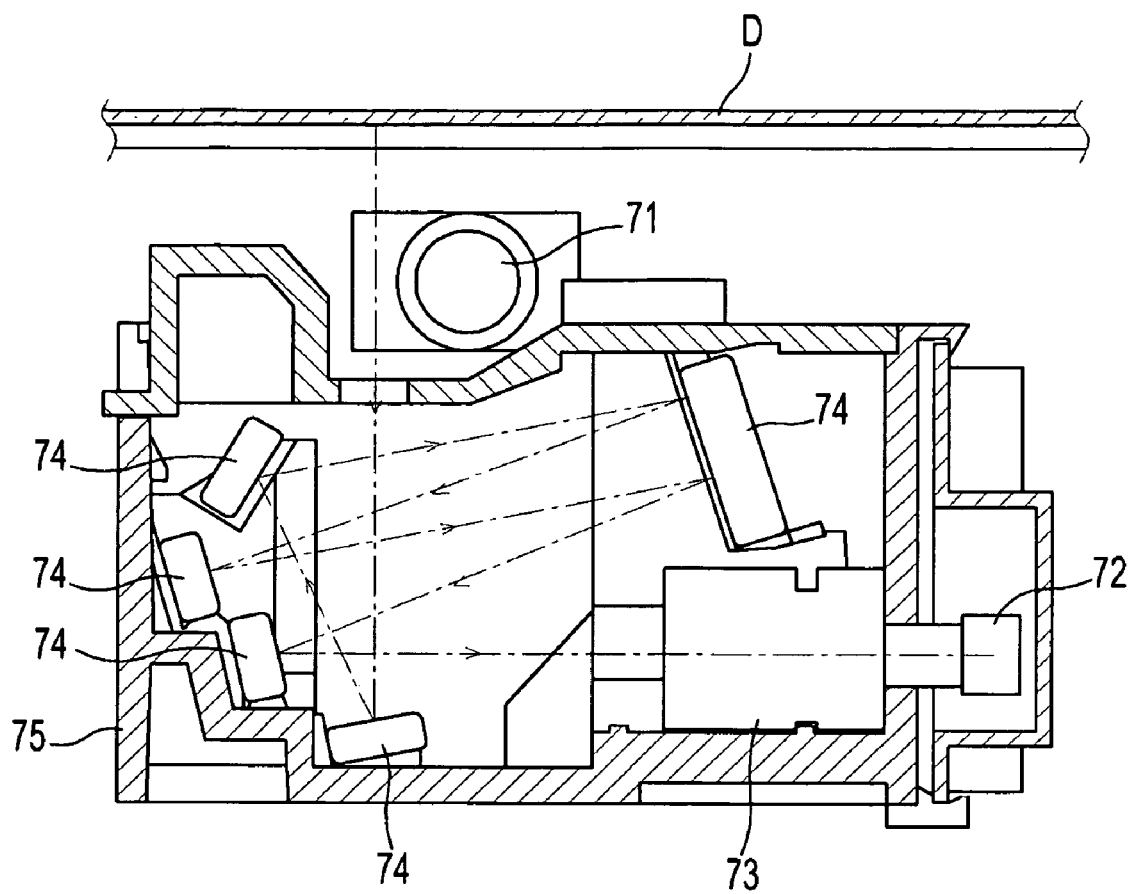
FIG. 2 illustrates a configuration of a reading unit of the image reading device according to an embodiment of the present invention as illustrated in FIG. 1.

FIG. 2 is a view illustrating a configuration of the reading unit of the image reading device according to the embodiment of the present invention.

As shown in FIGS. 1 and 2, the reading unit 70, according to the present embodiment, reads image information by irradiating light onto a document D. The reading unit 70 can read a document placed on the flat panel glass 61 while being moved under the flat panel glass 61 and also can read image information recorded on the document D delivered by the automatic document feeder 64 when located under the ADF glass 62.

The reading unit 70 includes a light source 71 to irradiate light to the document D, an image sensor 72 to convert the light reflected from the document D to the image sensor 72 into electric signals, a plurality of reflecting mirrors 74 to reflect and guide the light reflected from the document D to the image sensor 72, and a condensing lens 73 disposed in front of the image sensor 72 on an optical path to focus the light on the image sensor 72. Optical elements including the image sensor 72, reflecting mirrors 74 and condensing lens 73, except for the light source 71, are disposed in an optical element frame 75, to protect the optical elements from impurities, such as dust, or other similar impurities, because these optical elements are liable to be contaminated by the impurities.

The light source 71 may be realized by a variety of lamps or light emitting diodes or other similar light emitting devices. Since these lamps or light emitting diodes emit heat, the light source 71 increases the interior temperature of the reading device body 2a. For this reason, the image reading device 2, according to the present embodiment, includes a cooler 78, which will be described later in detail.

The image sensor 72 irradiates light onto a document to detect the light reflected from the document. The image sensor 72 is able to read information from the document by converting the detected quantity of the light into electric signals. The image sensor 72 may be a Charge Coupled Device (CCD), Contact Image Sensor (CIS), or other similar sensing devices.

Provided in the reading device body 2a are a carrier 76 on which the reading unit 70 is mounted, a drive device (not shown) to rectilinearly reciprocate the carrier 76, and a guide shaft 77 to guide rectilinear reciprocating movement of the carrier 76. The drive device drives the carrier 76 during a scanning operation using the flat panel glass 61 and generally, includes a motor, belt, pulley, and the like. The drive device is well known in the art and thus, a detailed description thereof will be omitted.

Figure 3:
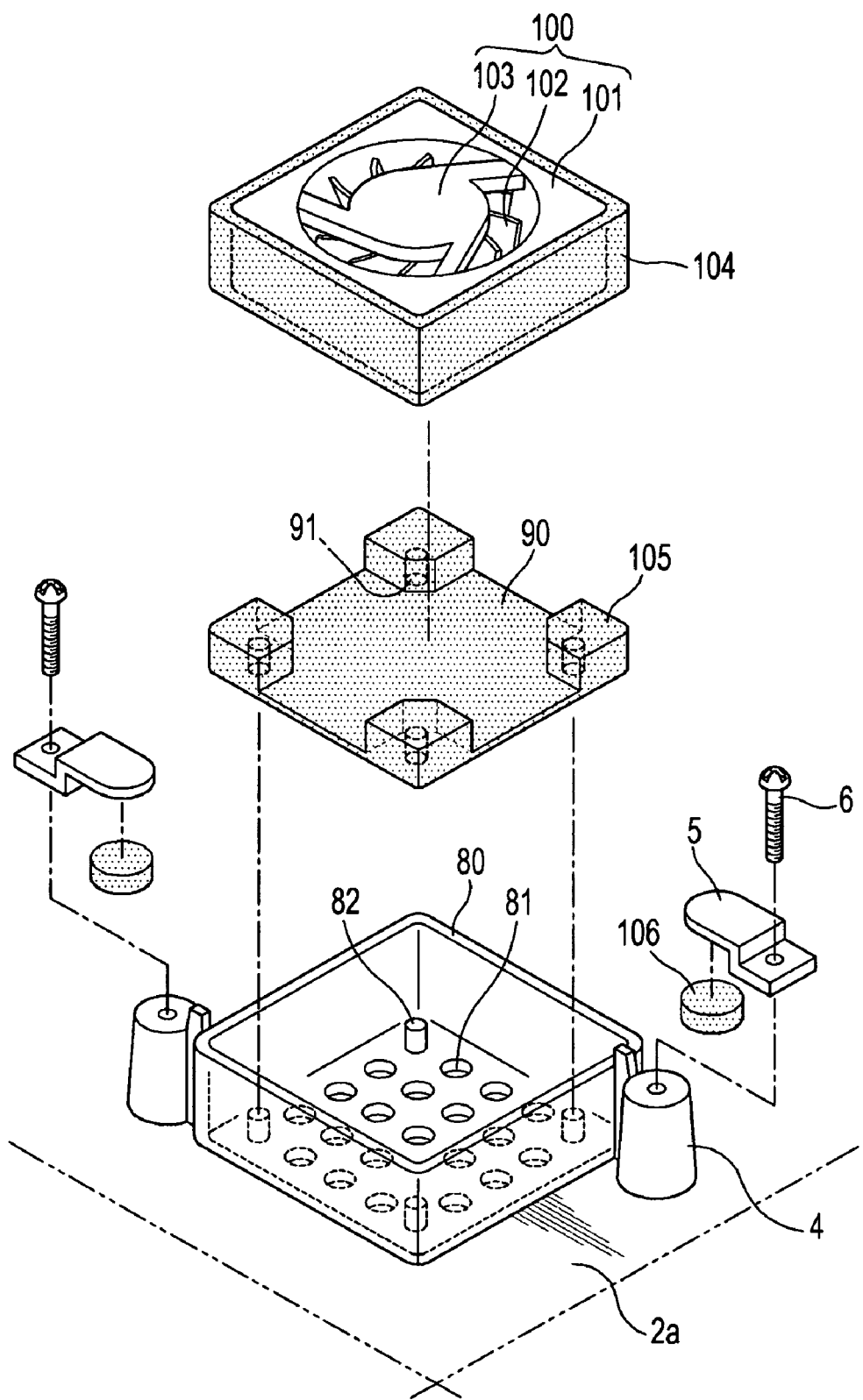
FIG. 3 is an exploded perspective view illustrating a cooler according to the embodiment as illustrated in FIG. 1.
Figure 4:
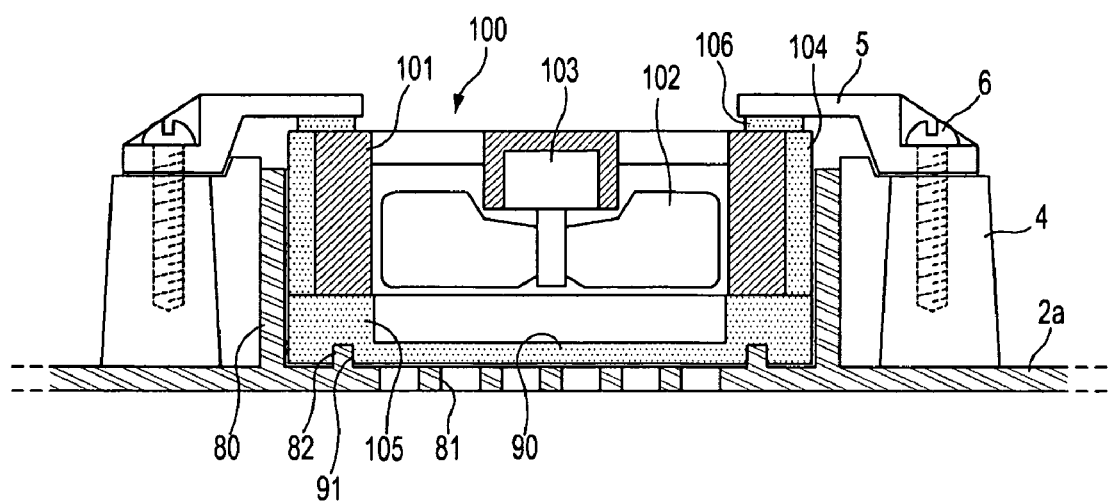
FIG. 4 is an assembly perspective view of the cooler as illustrated in FIG. 3.

FIG. 3 is an exploded perspective view illustrating the cooler 78, according to the embodiment, and FIG. 4 is an assembly perspective view of the cooler 78 of FIG. 3.

As shown in FIGS. 1 to 4, the cooler 78, according to the present embodiment, includes a housing 80, a cooling unit 100 and a filter member 90 coupled to the housing 80.

The housing 80 protrudes from the bottom of the reading device body 2a by a predetermined height to define a predetermined interior space. Although the top of the housing 80 is entirely open, the bottom of the housing 80 is partially open through a plurality of openings 81. The filter member 90 and cooling unit 100 are inserted into the housing 80 through the top of the housing 80.

The plurality of openings 81 allow outside air to move into the reading device body 2a. Since the plurality of openings 81 is perforated in the bottom of the housing 80, there is no risk of large-size impurities being introduced into the housing 80 (or the reading device body 2a). Although the air is able to move into the reading device body 2a through the plurality of openings 81 based on natural convection, in the present embodiment, the cooler 78 is provided to move the air into the reading device body 2a via forced convection, in order to increase cooling efficiency. Specifically, the cooler 78 functions to reduce the interior temperature of the reading device body 2a, and more particularly, to remove heat emitted from the lamps or light emitting diodes used as the light source 71 as well as heat generated from other electronic elements.

The cooling unit 100 reduces the interior temperature of the reading device body 2a by creating forced movement of the air. The cooling unit 100 includes a case 101, a fan 102 rotatably supported in the case 101, and a motor 103 to drive the fan 102. The outside air is introduced into the reading device body 2a via rotation of the fan 102, thereby removing heat generated from the lamps or light emitting diodes and other electronic elements. However, as the outside air is introduced into the reading device body 2a, there is a risk of impurities, such as dust, or other such impurities, contained in the outside air being introduced into the reading device body 2a. In the present embodiment, the filter member 90 filters impurities and prevents contamination of optical elements disposed in the reading device body 2a.

The filter member 90 filters impurities contained in the air. The filter member 90 is disposed on the bottom of the housing 80 to cover the plurality of openings 81. In this case, the filter member 90 can be secured to the housing 80 as seating protrusions 82 of the housing 80 are inserted into seating recesses 91 of the filter member 90. The filter member 90 is made of sponge and thus, can filter impurities, such as dust, etc., while allowing passage of the air. Accordingly, when the air is moved by the cooling unit 100, the air is introduced into the reading device body 2a after passing through the filter member 90 to filter impurities contained therein, thereby reducing the interior temperature of the reading device body 2a.

The cooling unit 100 causes vibration during rotation of the fan 102. To reduce vibration Of the cooling unit 100, the cooler 78 includes a first damper member 104, second damper members 105 and third damper members 106.

The first damper member 104 is disposed between the cooling unit 100 and the housing 80 and is configured to surround an outer periphery of a case 101 of the cooling unit 100. The first damper member 104 is made of an elastic material, such as sponge, or other similar dampening material, and absorbs vibration between the cooling unit 100 and the housing 80 so as to prevent transmission of vibration of the cooling unit 100.

The second damper members 105 are disposed between the cooling unit 100 and the filter member 90. The second damper members 105 are integrally formed with the filter member 90. Specifically, the second damper members 105 protrude from respective corners of the filter member 90. The second damper members 105 are made of the same material as the filter member 90, however aspects of the present invention are not limited thereto. Since both the filter member 90 and second damper members 105 are made of an elastic material, such as sponge, or other similar elastic material, the second damper members 105 disposed between the cooling unit 100 and the filter member 90 absorb vibration of the cooling unit 100 so as to absorb vibration of the cooling unit 100.

As the cooling unit 100 is supported by the second damper members 105, a predetermined space is defined between the filter member 90 and the cooling unit 100. If there is no second damper member 105, a gap between the filter member 90 and the cooling unit 100 is excessively narrow and causes noise due to the flow of air. The second damper members 105 provide a desired gap between the filter member 90 and the cooling unit 100, reducing the flow noise of air.

Holders 5 are provided to secure an upper end of the cooling unit 100, and the third damper members 106 are provided between the respective holders 5 and the cooling unit 100. The third damper members 106 are made of an elastic material, such as sponge, or other similar elastic materials, and absorb vibration of the cooling unit 100 so as to prevent vibration of the cooling unit 100 from being transmitted to the holders 5. Here, the holders 5 are fastened to screw fastening portions 4 of the reading device body 2a using screws 6.

Figure 5:
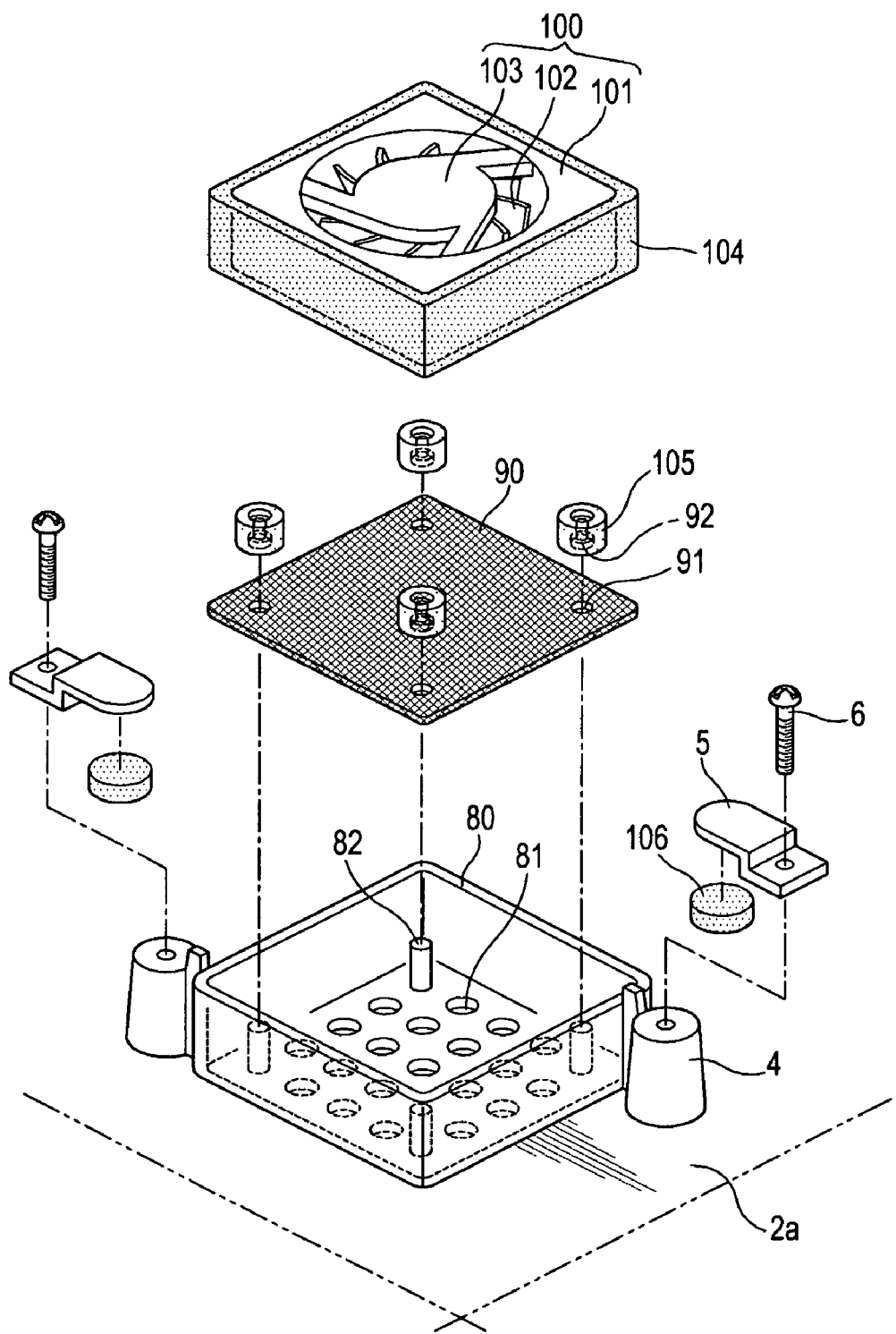
FIG. 5 is an exploded perspective view illustrating a cooler according to another embodiment of the present invention.
Figure 6:
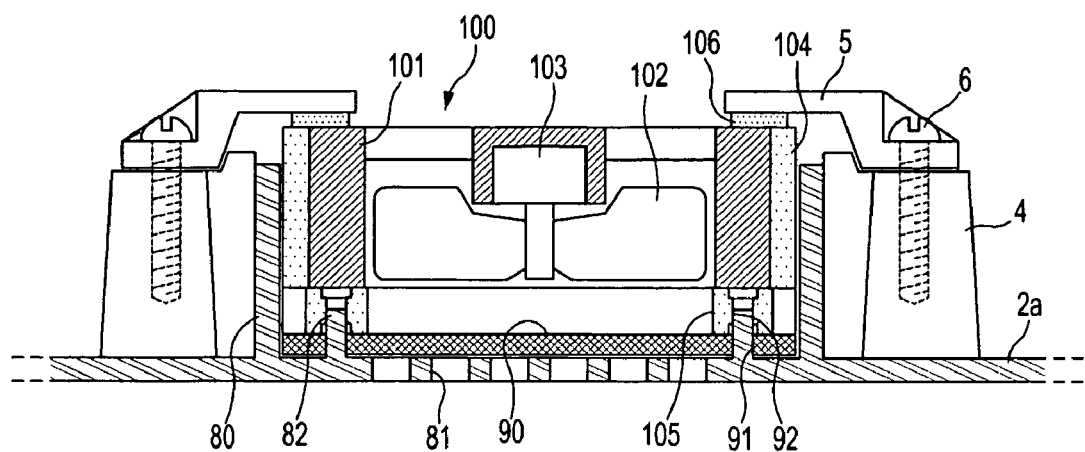
FIG. 6 is an assembly perspective view of the cooler as illustrated in FIG. 5.

FIG. 5 is an exploded perspective view illustrating a cooler according to another embodiment of the present invention, and FIG. 6 is an assembly perspective view of the cooler of FIG. 5.

As shown in FIGS. 5 and 6, the cooler 78 according to another embodiment includes the housing 80, filter member 90, cooling unit 100, first damper member 104, second damper members 105 and third damper members 106. The housing 80, filter member 90, cooling unit 100, first damper member 104 and third damper members 106 shown in FIGS. 5 and 6 are similar to the housing 80, filter member 90, cooling unit 100, first damper member 104 and third damper members 106 shown in FIGS. 3 and 4. However, the second damper members 105 shown in FIGS. 5 and 6 differ from the second damper members 105 shown in FIGS. 3 and 4.

Referring to FIGS. 5 and 6, the second damper members 105, according to another embodiment, are provided as individual members seated on the filter member 90. In this case, after seating recesses 92 of the second damper members 105 are aligned with the seating recesses 91 of the filter member 90, the seating protrusions 82 of the housing 80 are inserted into the seating recesses 91 and 92.

The second damper members 105 provided between the filter member 90 and the cooling unit 100 are made of an elastic material, such as sponge, rubber, or the like, and therefore, absorb vibration of the cooling unit 100 so as to reduce vibration of the cooling unit 100.

Referring to FIGS. 3 and 4, the second damper members 105, provide a desired gap between the filter member 90 and the cooling unit 100, achieving a remarkable reduction in flow noise of air.

Hereinafter, operation of the image reading device 20 will be described with reference to FIGS. 1 through 6. During a scanning operation, the light source 71 of the reading unit 70 emits heat, increasing the interior temperature of the reading device body 2a. To reduce the interior temperature of the reading device body 2a, the cooler 78 is operated. The cooling unit 100 included in the cooler 78 causes forced movement of air, thereby removing the heat generated from the light source 71.

The cooling unit 100 contains the fan 102 and thus, causes vibration. The first damper member 104 provided between the cooling unit 100 and the housing 80 absorbs the vibration and also, the second damper members 105 provided between the cooling unit 100 and the filter member 90 absorb the vibration.

The filter member 90 intercepts introduction of impurities into the reading device body 2a, preventing contamination of optical elements received in the reading unit 70. Moreover, the second damper members 105 provide a predetermined space between the filter member 90 and the cooling unit 100, achieving a reduction in the flow noise of air.

The cooler 78 can prevent impurities from being introduced into the reading device body 2a, and reduce the interior temperature of the reading device body 2a. With a reduction in vibration and noise using the cooler 78, enhanced operational reliability of the image reading device 2 can be achieved.

As is apparent from the above description, the embodiments provide an image reading device capable of reducing flow noise of air caused by a space defined between a filter member and a cooling unit.

Further, as the filter member is integrally formed with a damper member, price reduction as well as simplified manufacture and assembly can be accomplished.

Furthermore, using the filter member to remove impurities and prevent contamination of optical elements results in enhanced operational reliability of the device.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An image reading device comprising:
a body having a reading unit;
a cooling unit disposed in the body and moving air into the body to cool the reading unit;
a filter member disposed apart from the cooling unit and removing dust contained in the air; and
a damper member having one side supported by the filter member and the other side supported by the cooling unit, the damper member and the filter member being integrally formed as one unit;
wherein the filter member is spaced apart from the cooling unit by the height of the damper member forming a void space between the filter member and the cooling unit.

2. The image reading device according to claim 1, wherein the damper member and filter member are formed of an elastic material.

3. The image reading device according to claim 2, wherein the damper member and filter member are formed of sponge.

4. The image reading device according to claim 1, wherein the cooling unit is coupled to the top of the housing and the filter member is coupled to the bottom of the housing.

5. The image reading device according to claim 4, wherein the filter member includes a seating recess, and the housing includes a seating protrusion to be inserted into the seating recess.

6. The image reading device according to claim 1, wherein the housing includes an opening and the filter member covers the opening.

7. The image reading device according to claim 1, wherein the damper member is disposed between the filter member and the cooling unit in a predetermined space therebetween.

8. A cooler of an image reading device, the cooler comprising:
a housing;
a cooling unit disposed in the housing attached to a body of the image reading device to move air into the body of the image reading device;
a filter member disposed on a side of the cooling unit attached to the body of the image reading device; and
a damper member disposed between the cooling unit and the filter,
wherein the filter member is spaced apart from the cooling unit by the height of the damper member forming a void space between the filter member and the cooling unit, and
wherein the filter member and the damper member are integrally formed as one unit.

9. The cooler of claim 8, wherein the filter member and the damper member are formed of an elastic material.

10. The cooler of claim 9, wherein the filter member and the damper member are formed of sponge.

11. The cooler of claim 8, wherein the housing comprises a plurality of openings facing a plurality of openings on the body of the image reading device.

12. A cooler of an image reading device, the cooler comprising:
a cooling unit disposed on a side of a body of the image reading device to move air into the body of the image reading device; and
a damper member disposed between the cooling unit and the body of the image reading device,
wherein the damper member physically contacts both the cooling unit and the body of the image reading device and forms a void space between the image reading device and the cooling unit, wherein the void space is based on the height of the damper member and wherein the damper member comprises a filter member.

13. The cooler of claim 12, wherein the filter member is spaced apart from the cooling unit at a predetermined distance.

14. The cooler of claim 12, wherein the filter member and the damper member are integrally formed so as to be one unit.

15. The cooler of claim 12, wherein the filter member and the damper member are formed of an elastic material.

16. The cooler of claim 15, wherein the filter member and the damper member are formed of sponge.

17. The cooler of claim 12, wherein the filter is disposed above an opening on the body of the image reading device.

* * * * *